(12) United States Patent
Abraham et al.

(10) Patent No.: US 6,329,463 B1
(45) Date of Patent: Dec. 11, 2001

(54) HIGH TEMPERATURE, OIL RESISTANT THERMOPLASTIC VULCANIZATES MADE FROM POLAR PLASTICS AND ACRYLATE OR ETHYLENE-ACRYLATE ELASTOMERS

(75) Inventors: Tonson Abraham, Strongsville; Sabet Abdou-Sabet, Akron, both of OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/618,861

(22) Filed: Jul. 18, 2000

Related U.S. Application Data

(63) Continuation-in-part of application No. 08/987,944, filed on Dec. 10, 1997, now abandoned.

(51) Int. Cl.$^7$ .................................................. C08L 35/02
(52) U.S. Cl. .................... 525/92 A; 525/132; 525/146; 525/173; 525/176
(58) Field of Search ..................................... 525/132, 146, 525/176, 173, 92 A

(56) References Cited

U.S. PATENT DOCUMENTS

| | | | | |
|---|---|---|---|---|
| 3,758,629 | * | 9/1973 | Thill | .................................. 525/329.9 |
| 5,300,573 | * | 4/1994 | Patel | ...................................... 525/109 |

\* cited by examiner

*Primary Examiner*—Patricia A. Short
(74) *Attorney, Agent, or Firm*—William A. Skinner; Samuel B. Laferty

(57) ABSTRACT

A polar thermoplastic and acrylate or ethylene acrylate based polar rubbers form a useful thermoplastic vulcanizate when the rubber is selectively cured with curatives which do not affect the polar thermoplastic and do not generate volatile organics. Examples of thermoplastics include aromatic polyesters, polycarbonates, poly(phenylene oxide), or combinations thereof. Examples of curatives include compounds with a multifunctional oxazoline, oxazine or imidazoline, which can react with functional groups such as carboxylic acid groups on the rubber.

16 Claims, No Drawings

HIGH TEMPERATURE, OIL RESISTANT THERMOPLASTIC VULCANIZATES MADE FROM POLAR PLASTICS AND ACRYLATE OR ETHYLENE-ACRYLATE ELASTOMERS

CROSS REFERENCE TO RELATED APPLICATION

This application is a continuation in part of application Ser. No. 08/987,944 filed Dec. 10, 1997, now abandoned.

FIELD OF INVENTION

The present invention relates to thermoplastic vulcanizates (TPVs) containing high melting point thermoplastics such as aromatic/aliphatic polyesters and a vulcanized polar rubber interdispersed therein or dispersed therein. The use of preferred curatives, e.g. bisoxazolines, have the advantage of selectively crosslinking the rubber phase without affecting the thermoplastic and without causing the evolution of volatile organics.

BACKGROUND OF THE INVENTION

Heretofore, crystalline polyolefins such as polyethylene and polypropylene when utilized as the thermoplastic component in thermoplastic vulcanizates have an upper continuous use temperature below 130° C. due to the relatively low melting point of the crystalline thermoplastic phase (e.g. commercially available polypropylene has a melting temperature of 165° C.). Accordingly, these hydrocarbon based compositions have limited use in under the hood applications of a vehicle where high temperatures are encountered and where low hydrocarbon oil swell is desirable. Blends of polar thermoplastics and polar rubbers in uncrosslinked form tend to have undesirable high compression set and poor mechanical strength. Conventional curatives for the polar rubbers generally have undesirable effects on a thermoplastic vulcanizate formed from a polyester and an acrylate rubber, such as degrading the thermoplastic or the release of undesirable volatile components during the curing process.

SUMMARY OF THE INVENTION

The thermoplastic vulcanizate compositions of the present invention contain a polar thermoplastic and a crosslinked polar rubber. Preferred polar thermoplastics include polyesters, polycarbonates, polyphenylene oxide, or combinations thereof Preferred rubbers include acrylate (acrylic) rubbers, and ethylene-acrylate rubbers with pendant or terminal carboxylic acid or carboxylic anhydride functionality. Preferred curatives include multi-functional oxazolines and oxazine compounds.

DETAILED DESCRIPTION

Polyesters are preferred as the thermoplastic phase of a thermoplastic vulcanizate (TPV). The polyesters of the thermoplastic defined herein are condensation polymers as contrasted to the acrylate rubbers which are formed by addition polymerization. The various polyesters can be either aromatic or aliphatic or combinations thereof and are generally directly or indirectly derived from the reactions of diols such as glycols (including aliphatic, cycloaliphatic and aryl or combinations thereof) having a total of from 2 to 10, 12 or 15 carbon atoms and desirably from about 2 to about 4 or 6 carbon atoms with either aliphatic acids having a total of from about 3 to about 20 carbon atoms and desirably from about 3 to about 15 or aromatic acids having a total of from about 8 to about 15 carbon atoms or combinations thereof.

The use of aromatic diacids generally result in desirable higher softening temperatures. Acids generally refer to dicarboxylic acids, their anhydrides, or their dialkyl esters. Generally, aromatic polyesters are preferred such as poly (ethylene terephthalate) (PET). poly(propylene terephthalate) (PPT), poly(trimethylene terephthalate) (PTT), poly(butylene terephthalate) (PBT), poly(ethylene isophthalate), poly(butylene naphthalate) and the like, as well as an end-capped epoxy derivative thereof e.g., a monofunctional epoxy poly(butyleneterephthalate). Desirably at least 70 or 80, more desirably at least 90 mole percent of the polyester, based on the dicarboxylic acid component, is terephthalic acid radicals. Desirably at least 70 or 80, more desirably at least 90 mole percent of the polyester, based on the diol component, is derived from ethylene glycol, 1,3-propylene glycol or 1,4-butylene glycol or combinations thereof. Trifunctional and higher functionality acids and polyols desirably can be in the polyester in small amounts, such as less than 1, 5, or 10 mole percent of the acid or polyol component. U.S. Pat. No. 3,692,744 discloses such polyesters.

Various polycarbonates can also be utilized as the thermoplastic and the same are esters of carbonic acid and the above diols. A suitable polycarbonate is the ester of carbonic acid and bisphenol A, i.e., poly(carbonyldioxy-1,4-phenyleneisopropylidene-1,4-phenylene). The various ester polymers can also include polyester block copolymers such as those containing at least one block of a polyester with a softening temperatures above 100° C. and at least one rubbery block with a softening temperature below 100° C. and desirably below 75° C. Such rubbery blocks include a polyether derived from at least one glycol having from 2 to 6 carbon atoms, e.g., polyethylene glycol, or from at least one alkylene oxide having from 2 to 6 carbon atoms. The rubbery block can also be another polyester that has a softening point below 100° C. or more desirably below 75° C. A preferred block polyester is poly(butylene terephthalate)-b-(tetramethylene glycol) which is available as Hytrel™ from DuPont. A preferred polyester block copolymer described in U.S. Pat. No. 4,981,908 is herein incorporated by reference. That block copolymer has polyester blocks with a softening temperature above 100° C. and polyester blocks with a softening temperature of less than 100 or less than 75° C. in the weight ratios of from 1:4 to 1:0.1 respectively. Coupling species including ester linkages and others, e.g. urethane, epoxy, etc. The block copolymers desirably have a number average molecular weight of at least 5000. The dicarboxylic acids desirably have molecular weights of 300 or less for the molecule less the carboxylic acid groups. The glycols of the ester desirably have a molecular weight of 300 or less for the molecule less the hydroxyl groups.

The molecular weight of the various polyesters is such that it is a suitable engineering plastic. Accordingly, the weight average molecular weight of the various polyesters desirably range from about 40,000 to about 100,000 with from about 90,000 to about 100,000 being preferred.

Polyphenylene oxides can be used as part or all of the thermoplastic phase. They are commercially available and generally have a molecular weight such that they also have a glass transition temperature of at least 150° C., desirably at least 1 75° C., and preferably 210° C.

The acrylic rubbers (acrylate) useful as the rubber phase of the thermoplastic vulcanizate are polymerized from monomers comprising alkyl acrylates wherein the alkyl portion of the ester has from 1 to 10 or 12 carbon atoms, with from 1 to 4 carbon atoms being preferred. The total carbon atoms of each alkyl acrylate may range from 4 to 13 or 15 carbon atoms and include alkyl substituted, e.g. alkyl alkylacrylates such as methyl methacrylate in small amounts, i.e., desirably less than 5, 10 or 15 mole percent. Desirably the monomers include unsaturated mono or polycarboxylic acids or anhydrides thereof having from about 2 to about 15 carbon atoms. Monomers such as methyl methacrylate form thermoplastic rather than rubbery polymers when present in high amounts. Specific examples of rubbery acrylic polymers include polymers of methyl acrylate, butyl acrylate, butyl acrylate, ethylhexyl acrylate, and the like. The acrylic polymers generally include repeat units with pendant or terminal functionality (e.g., pendant carboxylic groups to facilitate crosslinking with oxazoline curatives). These polymers desirably have from about 1 or 2 to about 10 mole percent, more desirably from about 2 or 3 to about 8 mole percent repeat units with at least one carboxylic acid or anhydride of a dicarboxylic acid. If the polymers are only copolymers of acrylate and acid or anhydride monomers they desirably have from about 90 to about 98 mole percent repeat units from acrylates, more desirably from about 92 to about 97 or 98 mole percent.

The carboxylic acid cure site in the rubber may alternatively be generated by heat during the rubber and plastic melt blending process. For example, tert-butyl acrylate or tert-butoxycarbonyl acrylate that is copolymerized into the ethylene-acrylate or acrylate rubber can decompose to a repeat unit as from acrylic acid and a free isobutylene molecule (and carbon dioxide in the case of the tert-butoxycarbonyl group), thus generating the desired carboxylic acid cure sites. The tert-butyl acrylate. tert-butyl fumarate and/or tert-butoxycarbonyl acrylate are desirably present as repeat units in the amounts set forth above for carboxyl and/or anhydride groups. A limited amount of unmasked acid cure sites in the rubber, or acids such as camphorsulfonic acid or methanesulfonic acid may be used to catalyze decomposition of the pendent tert-butyl groups in such a rubber. The use of the masked cure sites described above may be useful in cases where the rubber does not form a good blend with the plastic due to acid catalyzed decomposition and/or crosslinking reactions of the rubber. When the cure sites in the rubber are masked, the desired cure sites are generated only after an intimate rubber and plastic blend has been formed, thus precluding a premature cure of the rubber portion of the TPV. This technology could therefore offer a process advantage in TPV production. The rubber, plastic, and curative could be melt mixed simultaneously, instead of the normal procedure of adding the curative to the rubber and plastic melt blend. The presence of the masked cure site would prevent rubber crosslinking prior to suitable rubber and plastic blend formation.

Although pendant functionality and curatives are listed as separate components it is anticipated that alternatively the curatives could be pendantly or terminally attached to the acrylic rubber or ethylene-acrylate rubber prior blending the thermoplastic and rubber to form the TPV.

Other suitable acrylic rubbers include copolymers of ethylene and the above-noted alkyl acrylates wherein the amount of ethylene is desirably high, e.g. from about 10 to about 90 mole percent, desirably from about 30 to about 70 mole percent, and preferably from about 50 to about 70 mole percent of the repeat groups based upon the total number of moles of repeat groups in the copolymer. Thus the alkyl acrylates in the copolymer are desirably from about 10 to about 90 mole percent, more desirably from about 30 to about 70 mole percent, and preferably from about 30 to about 50 mole percent of the ethylene-acrylate copolymers.

Other acrylic copolymers include polymers from three or more different monomers such as ethylene-acrylate-carboxylic acid polymers, or ethylene-acrylate-maleic anhydride polymers, wherein the unsaturated acids have from 2 to 15 carbon atoms and desirably from 2 to 10 carbon atoms. Such ethylene-acrylate-maleic anhydride terpolymer rubbers are available from DuPont. More specifically, such polymers from three or more different monomers generally contain from about 35 to about 90 mole percent and desirably from about 48 or 60 to about 80 mole percent of ethylene repeat groups, generally from about 0.5 to about 10 mole percent and desirably from about 1 or 2 to about 8 mole percent of carboxylic acid repeat and/or anhydride groups (e.g. from an unsaturated carboxylic acid), and generally from about 9.5 or 10 to about 60 or 65 mole percent and desirably from about 18 or 19 to about 50 mole percent of alkyl acrylate repeat groups based upon the total number of repeat groups in the terpolymer. The acid repeat groups are preferably carboxylic acid groups derived from unsaturated mono or polycarboxylic acids or anhydrides of unsaturated polycarboxylic acids, which repeat groups have been copolymerized into the acrylic rubber. A specific commercially available compound is Vamac GLS, manufactured by DuPont, which generally has about 68 mole percent ethylene, about 30 mole percent of methyl acrylate, and about 2 mole percent of anhydride functionality.

While peroxides are not used for curing the acrylate rubbers during mixing for TPV synthesis, they may be used to partially crosslink the acrylate rubber before it is mixed with the thermoplastic phase. Desirably substantially all the peroxide is decomposed prior to or early in the mixing with the thermoplastic in order to prevent thermoplastic degradation.

The amount of the polar rubber utilized in the present invention generally ranges from about 25 or 50 to about 400 parts by weight, desirably from about 100 or 200 to about 375 parts by weight, and preferably from about 250 to about 360 parts by weight for every 100 parts by weight of the one or more polar thermoplastic polymers.

The one or more thermoplastic polymer is desirably from about 15 to about 70 parts by weight and more desirably from about 25 to about 65 parts by weight per 100 parts by weight total for said thermoplastic polymers and rubber. The rubber is desirably from about 30 to about 85 parts by weight, more desirably from about 35 to about 75 parts by weight per 100 parts by weight total of said thermoplastic polymers and said rubber.

In the practice of the present invention, it is not an objective to affect in any way the integrity of the engineering thermoplastic polymer. This polymer forms the matrix within which the crosslinked rubber particles are carried. The crosslinking should therefore not be carried out in a way which causes degradation of the thermoplastic (e.g. by chain fragmentation), or crosslinking of the thermoplastic (either with itself or with the rubber), or grafting of the rubber and thermoplastic. Rather the objective is to cause the rubber to selectively crosslink, i.e. to form attachments between chains of the rubber molecules themselves, without involving the thermoplastic matrix.

As amine curatives can degrade many of the polar thermoplastics (polyesters, polycarbonates), it is desirable to exclude amine curatives. Further, the reaction of an amine curative with the anhydride cure site on the rubber would release one molecule of water, which would require devolatilization and the water released could cause hydrolysis of the thermoplastic matrix.

The use of multifunctional oxazoline, oxazine and/or imidazoline curatives are preferred in this invention due to the lack of interaction with or degradation of the polar thermoplastics and the absence of by-products due to the addition curing reaction with the rubber.

Another important aspect of the present invention is the utilization of addition type curatives which, unlike free radical curatives, do not break down the thermoplastic phase and desirably do not form volatile by-products. A highly preferred addition curative or crosslinking agent are the various multifunctional oxazolines including polyvalent oxazolines such as 2,2'-bis(2-oxazoline), 2,2'-hexamethylenedicarbamoylbis(2-oxazoline), and 1,3-phenylene-2,2'-bis(2-oxazoline); multifunctional oxazines including bis-5,6-dihydro-4H-1,3-oxazine; multifunctional imidazolines and polycarbodiimides.

The multifunctional (polyvalent) oxazolines and oxazines generally have the formula

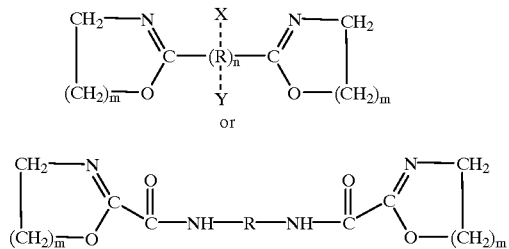

wherein R is an aliphatic or aromatic hydrocarbon group such as alkylene or arylene having 1 to 24 carbon atoms optionally substituted with one or more lower alkyl groups having 1 to 6 carbon atoms or substituted with an aryl group having 6 to 19 carbon atoms; m is 1 or 2; n is 0 or 1, when n equals 1 then X and Y independently are hydrogens or a 2-oxazoline group or 1,3-oxazine group, and when n equals 0 then R is not present and no X and Y are present, further each oxazoline or oxazine group of the above formula may optionally be substituted with an alkyl of 1 to 6 carbon atoms. Further descriptions of said polyvalent oxazolines are given in U.S. Pat. No. 4,806,588 herein incorporated by reference. The multifunctional 1,3-oxazine compounds are known to the art.

The multifunctional imidazolines have the formula

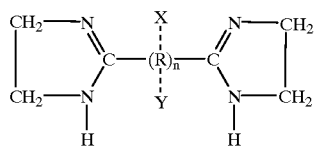

where R and n are defined as above for the multifunctional (polyvalent) oxazolines and X and Y are hydrogens or imidazoline groups. A preferred multifunctional imidazoline is bismidazoline.

The polycarbodiimide is desirably an oligomeric polycarbodiimide such as shown below

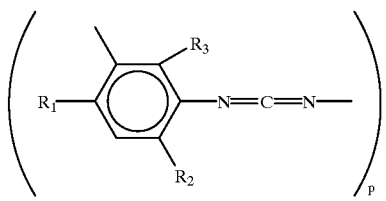

where $R_1$, $R_2$, and $R_3$ are individually alkyl of 1 to 6 carbon atoms or aryl groups of 6 to 12 carbon atoms and p is from 12 to 42.

The amount of curative will vary depending on type used as well as the degree of cure desired, as is well recognized in the art. The various additional catalysts or combinations thereof are generally utilized in an amount of from about 1 to 12, desirably from 2 to 10, and preferably from about 2.5 to about 7 parts by weight for every 100 parts by weight of the rubber. The addition curatives effect crosslinking by reacting with functional groups such as the carboxylic acid groups present in the acrylic or ethylene-acrylate rubbers.

In addition to the thermoplastic polymer (polyester or phenylene oxide), and the rubber (acrylate or ethylene acrylate), the processing agents and the curative components, the compositions of the present invention can include various conventional additives such as reinforcing and non-reinforcing fillers, extenders, antioxidants, stabilizers, plasticizers, rubber processing oil, extender oils, lubricants, antiblocking agents, antistatic agents, waxes, foaming agents, pigments, flame retardants and other additives known in the rubber compounding art. Such additives can generally comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The plasticizer may also be a low molecular weight polyester or a sulfonamide. The amount of plasticizer may range from 0 to 100 or 200 parts by weight per 100 parts by weight rubber.

Regardless of the thermoplastic, rubber, and other components of the present invention, the rubber component(s) is desirably partially or fully vulcanized (crosslinked) in one or more steps in preparing the thermoplastic vulcanizate. The word "vulcanizate" as used herein does not require sulfidic crosslinks. The terms "fully vulcanized" and "completely vulcanized" as used in the specification and claims means that the rubber component to be vulcanized has been cured to a state in which the elastomeric properties of the crosslinked rubber are similar to those of the rubber in its conventional vulcanized state, apart from the thermoplastic vulcanizate composition. The degree of cure can be described in terms of gel content or, conversely, extractable components. Desirably in one embodiment, at least 90 percent, more desirably at least 95 percent and preferably at least 98 weight percent of the rubber is non-extractable, after vulcanization, with a solvent that readily dissolves the uncrosslinked rubber. Alternatively this can be expressed as at least 90, 95 or 98 weight percent of said rubber is crosslinked and/or said values are the gel content of the rubber. The degree of cure may be expressed in terms of crosslink density. All of these descriptions are well known in the art, for example in U.S. Pat. Nos. 5,100,947 and 5,157,081, both of which are fully incorporated herein by this reference.

The partial or complete crosslinking can be achieved by adding one or more of the above-noted rubber curatives to the blend of thermoplastic (e.g. polyester) and rubber (e.g. acrylate or ethylene-acrylate rubber) and then vulcanizing the rubber to the desired degree under conventional vulcanizing conditions. It is preferred that the rubber be crosslinked by the process of dynamic vulcanization. As used in the specification and claims, the term "dynamic vulcanization" means a vulcanization or curing process for a rubber contained in a blend of at least one thermoplastic and at least one rubber (thermoplastic vulcanizate components), wherein the rubber is vulcanized under conditions of shear at a temperature above the melting point of the thermoplastic component. The rubber is thus simultaneously crosslinked and dispersed, e.g. as fine particles, within the thermoplastic matrix, although other morphologies may also exist. Dynamic vulcanization is effected by mixing the thermoplastic vulcanizate components at elevated temperature in conventional batch mixing equipment (e.g., batch or continuous; internal or exposed mixing surfaces) such as multiroll mills. Banbury™ mixers, Brabender™ mixers, continuous mixers, mixing extruders and the like. The unique characteristic of thermoplastic vulcanizates such as in the present invention is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed. In the present invention the mixing temperature is desirably from about 180° C. to about 260 or 280° C. and preferably from about 200° or 220° C. to about 230 or 260° C.

The following general procedure can be used to form general thermoplastic vulcanizates and was used in the preparation of thermoplastic vulcanizates of the present invention as set forth in the examples.

Thermoplastic vulcanizates (TPVs) were produced in a laboratory Brabender plasticorder, model EPL-V5502. The mixing bowl had a capacity of 60 mL with roller type rotors, which gave good mixng for samples with batch weight of 40–45 grams. For higher batch weight TPVs, less bulky cam rotors were used, which gave a bowl capacity of 85 mL. TPVs were prepared at 240° C. and 75 rpm rotor speed. The rubber was masticated first, followed by addition of plastic materials when the rubber temperature had reached about 230° C. After a steady torque was obtained for 1–2 minutes in order to ensure as complete a homogenization as possible of the rubber and plastic melt blend, an appropriate amount of curative was added to achieve the desired state of rubber cure without affecting the thermoplastic. The curing was continued for an appropriate time, usually about 8 minutes. A level torque reading was generally obtained after about 4–5 minutes of curing. This is indicative that the desired cure level has been reached. The TPV obtained was sheeted when hot in a cold press, and subsequently compression molded at 250° C. in order to produce plaques for physical testing. Plasticizers were added either to the rubber and plastic melt blend prior to cure or to the TPV after 4–5 minutes of curing.

The thermoplastic vulcanizate compositions of the present invention generally have good tensile strength, good elongation and good compression set properties. Most notably, they have higher use temperature, e.g. up to 150° C. for continuous use and very low oil swell, i.e. excellent IRM903 oil resistance properties comparable to that of thermoset acrylate or ethylene-acrylate rubber. Oil swell values as measured by the percent of weight gain at 150° C. for 72 hours is generally 35 percent or less, desirably 20 to 25 percent or less, and preferably 15 percent or less in IRM903 oil. IRM903 oil is similar in swelling capability to ASTM #3 oil. The oil swell values are represented as weight gain in the following tables.

The thermoplastic vulcanizate compositions of the present invention can be used in applications wherever acrylate or ethylene-acrylate rubber is used. They have desirable elongations, modulus, low oil swell, low tension set, and low compression set. Thus, they can be utilizes as seals, gaskets, molded articles and the like. The thermoplastic vulcanizates can be mixed with other polymers such as polyamides (nylons) in broad mixing ratios to prepare thermoplastic vulcanizates with at least 10, 20 or 30 weight percent polyamide polymers based on the total weight of the thermoplastic vulcanizate.

The invention will be better understood by reference to the following examples, which serve to illustrate but not to limit the invention.

EXAMPLES

Example 1 describes the composition and properties of a blend of ethylene-acrylate rubber (Vamac GLS) and poly (butylene terephthalate) (Valox HR 326). A compression molded plaque from the blended product had inhomogenities visible to the naked eye, and poor product properties. The effect of dynamic vulcanization on this blend is illustrated in Example 2. The blend of Example 1, when dynamically vulcanized with a bisoxazoline curative, yielded a thermoplastic product with a dramatic improvement in physical properties and surface smoothness. Example 3 describes the preparation of a soft TPV by reducing the level of the bisoxazoline curative. In Example 4, the plastic phase of the TPV was a poly ester-ether. In Example 5, the rubber and plastic blend of Example I was dynamically vulcanized with a polycarbodiimide. In Example 6 a mixture of bisoxazoline (1,3-PBO) and polycarbodiimide (Stabaxol KE 9193, 15 wt. % Stabaxol™ 100 in a poly(butylene terephthalate)) is used as the curative.

Example 5 and 6 vary in that the Stabaxol P100 of Example 5 is present as a 15 wt. % component in the Stabaxol KE 9193 used in Example 6. Example 6 also has a second curative 1,3-PBO(a bisoxazoline).

Examples 7–9 establishes the applicability of this invention to carboxylated acrylate rubber. In Example 10 Vamac GLS rubber was reacted with a peroxide (vulcup 40KE) and HVA-2 in order to produce a partially cured rubber concentrate which was then further crosslinked with 1,3 PBO in Example 11. Plasticizers with diverse polar groups and polarity can be used to produce soft TPV compositions (Examples 12–19). Example 16 demonstrates the utility of a nonpolar plasticizer in a relatively polar TPV product.

The examples listed also demonstrate that soft TPVs with good physical properties can be obtained by plasticizer addition prior to or subsequent to the curing step. This methodology is available for temperature and power requirement control during mixing, which would be desirable for scale up from the laboratory to a larger production process.

Acrylate rubber A-22-106: copolymer of ethyl acrylate, butyl acrylate, and about 0.5 to about 10 mole % methacrylic acid (Tg~–30° C.) (Experimental rubber, Zeon Chemicals, Louisville, Ky.).

a) Vamac™ GLS rubber: Copolymer of ethylene, methyl acrylate (55 wt. %), and a monomer with a carboxylic acid cure site (DuPont Dow Eastomers, Stow, Ohio).

b) Valox™ 315: Poly(tetramethylene terephthalate) weight average molecular weigh of about 105,000 and number average molecular weight of about 50,000 (GE Plastics, Pittsfield, Mass.).

c) Valox™ 326: Poly(tetramethylene terephthalate), having lower molecular weight than Valox™ 315 and containing an antihydrolysis additive and blocked acid end groups in the polymer (GE Plastics).

d) 1,3-PBO: 2,2'(1,3-phenylene)-bis-(2-oxazoline) (TRAMACO, Japan Ltd., Tokyo, Japan)

e) Poly(methylphenylsiloxane): 710® fluid. (Aldrich Chemical Company, Milwaukee, Wis.).

f) Hexyl nicotinate: (Aldrich Chemical Company. Milwaukee. Wis.).

g) Reofos™ 50: Substituted triaryl phosphate (C.P. Hall Company. Stow, Ohio).

h) Plasthall™ P-900: Polyester phthalate, (C.P. Hall Company, Stow, Ohio).

i) Plasthall™ BSA: N-n-Butylbenzenesulfonamide (C.P. Hall Company, Stow, Ohio).

j) Plasthall™ 100: Isooctyl tallate (C.P. Hall company, Stow, Ohio).

k) TP-759: Polyester - ether plasticizer (Morton International, Inc., Woodstock, Ill.).

l) Flexon™ 885: Paraffinic oil (Exxon Petrochemical Corporation, Houston, Tex.).

m) Polybond™ 3009: Process aid, maleated high density polyethylene (1 wt. % bound maleic anhydride) (Uniroyal Chemical Company, Middlebury, Conn.).

n) Irganox™ B225: Phenolic antioxidant/substituted arylphosphite combination (CIBA Specialty Chemicals Corporation, Troy, Mich.).

o) Hytrel™ 8238: Poly(tetramethylene terephthalate)/poly(tetramethylene glycol) based segmented polyester-ether thermoplastic elastomer (DuPont Polymers, Wilmington, Del.).

p) Stabaxol™ KE 9193: 15 wt. % Stabaxol P-100 in poly(tetramethylene terephthalate) (Rhein-Chemie, Trenton, N.J.).

q) Stabaxol™ P100: Poly(2,4,6-triisopropyl-1,3-phenylenecarbodiimide) having a number average molecular weight of 10,000 (Rhein Chemie, Trenton, N.J.).

r) Stabaxol™ P: Poly(2,4,6-triisopropyl-1,3-phenylenecarbodiimide) having a molecular weight of 3,000 (Rhein Chemie, Trenton, N.J.).

s) HVA-2: 2,4-bismaleimidotoluene (DuPont Dow Elastomers, Stow Ohio).

t) Vulcup™ 40KE: 2,2'-bis(t-butylperoxy) diisopropyl benzene 40 wt. % in silane modified clay (Hercules, Wilmington, Del.).

TABLE I

| Example | 1 | 2 | 3 | 4 | 5 | 6 |
|---|---|---|---|---|---|---|
| Vamac GLS | 76.0 g | 76.0 | 76.0 | 76.0 | 76.0 | 76.0 |
| Valox HR 326 | 24.0 | 24.0 | 24.0 | — | — | — |
| 1,3-PBO | — | 4.04 | 1.43 | 2.38 | — | 3.56 |
| Valox 315 | — | — | — | — | 24.0 | 3.56 |

TABLE I-continued

| Example | 1 | 2 | 3 | 4 | 5 | 6 |
|---|---|---|---|---|---|---|
| Hytrel 8238 | — | — | — | 24.0 | — | — |
| Stabaxol KE 9193 | — | — | — | — | — | 23.75 |
| Stabaxol P100 | — | — | — | — | 9.5 | — |
| Physical Properties | | | | | | |
| Hardness (Shore A) | 37 | 75 | 67 | 70 | 67 | 76 |
| UTS (MPa) | 0.7 | 12.3 | 12.6 | 12.4 | 15.4 | 12.3 |
| UB (%) | 67 | 180 | 312 | 300 | 227 | 147 |
| M 100 (MPa) | — | 7.2 | 4.2 | 4.1 | 7.8 | 8.6 |
| CS (%, 22 hr, 100° C.) | — | 34 | 41 | 46 | 45 | 26 |
| CS (%, 22 hr, 150° C.) | — | — | 69 | 67 | — | — |
| Wt. Gain (%, 72 hr. 125° C.) | — | 27 | — | — | 23 | 17 |
| Wt. Gain (%, 72 hr. 150° C.) | — | — | 27 | 23 | — | — |
| Tension Set (%) | 58 | 10 | 13 | 8 | 10 | 12 |

TABLE II

| Example | 7 | 8 | 9 |
|---|---|---|---|
| Acrylate Rubber A-22-106 | 76.0 g | 76.0 | 76.0 |
| Valox HR 326 | 24.0 | 3.56 | 3.56 |
| 1,3-PBO | 1.66 | — | 0.71 |
| Stabaxol KE 9193 | — | 23.75 | 23.75 |
| Physical Properties | | | |
| Hardness (Shore A) | 78 | 77 | 78 |
| UTS (MPa) | 8.1 | 7.4 | 8.4 |
| UE (%) | 112 | 162 | 124 |
| M 100 (MPa) | 7.2 | 5.8 | 7.4 |
| CS (%, 22 hr, 100° C.) | 18 | 27 | 17 |
| Wt. Gain (%, 72 hr, 125° C.) | 22 | 21 | 20 |
| Tension Set (%) | — | 17 | — |

TABLE III

| Example | 10 | 11 |
|---|---|---|
| Vamac LS | 100.0 g | |
| HVA-2 | 0.96 | |
| Vulcup 40 KE | 0.53 | |
| Rubber Master Batch From Example 10 | | 72.5 |
| Valox 315 | | 28.6 |
| 1,3-PBO | | 3.12 |
| Physical Properties | | |
| Hardness (Shore A) | | 84 |
| UTS (MPa) | | 15.4 |
| UE (%) | | 187 |
| M 100 (MPa) | | 9.9 |
| CS (%, 22 hr, 100° C.) | | 43 |
| CS (%, 22 hr, 150° C.) | | 62 |
| Wt. Gain (% 72 hr. 150° C.) | | 19 |
| Tension Set (%) | | 21 |

TABLE IV

| Example | 12 | 13 | 14 | 15 | 16 | 17 | 18 | 19 |
|---|---|---|---|---|---|---|---|---|
| Vamac GLS | 76.0 g | 76.0 | 76.0 | 76.0 | 76.0 | 76.0 | 76.0 | 76.0 |
| Valox 315 | 24.0 | 24.0 | 24.0 | 24.0 | 24.0 | 24.0 | 24.0 | 24.0 |
| 1,3-BO | 3.09 | 3.09 | 3.09 | 3.09 | 3.09 | 3.09 | 3.09 | 3.09 |
| Plasthall P-900 | 3.3[1] | — | — | — | — | — | — | — |
| TP 759 | — | 1.0[2] | — | — | — | — | — | — |
| Reofos 50 | — | 2.0[2] | — | — | — | — | — | 11.16 |
| Plasthall BSA | — | — | 3.2[2] | — | — | — | — | — |
| Plasthall 100 | — | — | — | 3.8[2] | — | — | — | — |
| Flexon 885 | — | — | — | — | 3.3[2] | — | — | — |
| Poly(methylphenylsiloxane) | — | — | — | — | — | 9.5[1] | — | — |
| Hexyl nicotinate | — | — | — | — | — | — | 9.5[1] | — |
| Physical Properties | | | | | | | | |
| Hardness (Shore A) | 71 | 70 | 70 | 61 | 62 | 70 | 69 | 67 |
| UTS (MPa) | 14.1 | 12.4 | 11.7 | 9.7 | 7.8 | 12.4 | 15.0 | 12.8 |
| UE (%) | 249 | 257 | 227 | 207 | 191 | 229 | 252 | 221 |
| M 100 (MPa) | 5.3 | 5.2 | 5.3 | 4.2 | 3.9 | 5.0 | 5.0 | 5.4 |
| CS (%, 22 hr, 100° C.) | 39 | 36 | 42 | 40 | 42 | 40 | 41 | 34 |
| CS (%, 22 hr, 150° C.) | 65 | 67 | — | — | — | 59 | 65 | — |
| Wt. Gain (%, 72 hr, 125°C.) | — | — | 14 | 13 | 17 | — | — | — |
| Wt. Gain (% 72 hr, 150° C.) | 19 | 20 | — | — | — | 19 | 18 | 10 |
| Tension Set | 8 | 7 | 9 | 6 | 7 | 8 | 8 | 17 |

[1]Post cure addition of plasticizer
[2]Plasticizer added to molten rubber/plastic blend prior to cure.

The stress-strain properties of the compositions are determined in accordance with the test procedures set forth in ASTM D412. These properties include tension set (TS), ultimate tensile strength (UTS), 100 percent modulus (M100), and ultimate elongation at break (UE). The compression set (CS) according to ASTM D395 describes deformation when a sample is compressed for 22 hours at 100° C. The percent deformation reported is that portion of the initial deformation which is retained after the deforming stress is removed. The weight gain (oil swell) is the weight of IRM903 oil (nearly equivalent to ASTM #3 oil) retained as a percent based on the original sample weight after swelling for 72 hours at 125 or 150° C.

Advantageously the thermoplastic vulcanizates of this invention, which may also be referred to as thermoplastic elastomers, are rubber-like materials that, unlike conventional rubbers, can be processed and recycled like thermoplastic materials. This material is rubber-like to the extent that it will retract to less than 1.5 times its original length within one minute after being stretched at room temperature to twice its original length and held for one minute before release, as defined in ASTM D1566. Also, this material satisfies the tensile set requirements set forth in ASTM D412, and the elastic requirements for compression set per ASTM D395.

While in accordance with the patent statutes the best mode and preferred embodiment has been set forth, the scope of the invention is not limited thereto, but rather by the scope of the attached claims.

What is claimed is:

1. A thermoplastic vulcanizate, comprising:
   a blend of about 20 to about 30 parts by weight of an engineering thermoplastic selected from the group consisting of polyester, polycarbonate or polyphenylene oxide, or combinations thereof each having a melting point or glass transition temperature from about 160° C. to about 260° C. or more; and
   from about 70 to about 80 parts by weight of an acrylate rubber, ethylene-acrylate rubber, or combinations thereof, having pendant or terminal carboxylic anhydride functionality crosslinkably reactive with and at least partially crosslinked with a multifunctional oxazoline, oxazine, imidazoline, or combinations thereof which crosslink said rubber and do not degrade said engineering thermoplastic,
   wherein said parts by weight are based upon a total of 100 parts by weight of said thermoplastic and said rubber.

2. A thermoplastic vulcanizate according to claim 1, wherein said polyester, polycarbonate, polyphenylene oxide or combinations thereof comprises at least one aromatic polyester.

3. A thermoplastic vulcanizate according to claim 1, wherein said acrylate rubber, ethylene-acrylate rubber or combinations thereof is crosslinked to an extent wherein at least 90 weight percent of said rubbers are not extractable with a solvent that readily dissolves said rubber in uncrosslinked form.

4. A thermoplastic vulcanizate according to claim 1, wherein said rubber prior to crosslinking had a total of from about 0.5 to about 10 mole percent of repeat units of pendant anhydride of polycarboxylic acid.

5. A thermoplastic vulcanizate according to claim 1, wherein said rubber prior to crosslinking had a total of from about 2 to about 8 mole percent of repeat units of an anhydride of a polycarboxylic acid.

6. A thermoplastic vulcanizate according to claim 2, wherein at least 80 mole percent of the dicarboxylic acid repeat units of said aromatic polyester comprises repeat units from terephthalic acid and at least 80 mole percent of the diol repeat units of said polyester comprise 1,4-butylene glycol, 1,3-propylene or ethylene glycol, or combinations thereof.

7. A thermoplastic vulcanizate according to claim 2, wherein said rubber is present in amounts from about 250 to about 360 parts by weight per 100 parts by weight of said aromatic polyester, polycarbonate, polyphenylene oxide, or combinations thereof.

8. A thermoplastic vulcanizate according to claim 2, wherein at least 70 weight percent of the aromatic polyester is repeat units from poly(ethylene terephthalate), poly(1,3-propylene terephthalate), or poly(1,4-butylene terephthalate), or combinations thereof.

9. A thermoplastic vulcanizate according to claim 1, wherein said polyester comprises a polyester block copolymer, said polyester block copolymer comprising at least two blocks of a polyester with a softening point above 100° C. and at least one rubbery polyether or polyester block with a softening point below 100° C., and having a weight ratio of blocks having a softening point above 100° C. to those having a softening point below 100° C. of from 4 to 10.

10. A molded gasket, hose or seal comprising a thermoplastic vulcanizate according to claim 1.

11. A process for preparing a thermoplastic vulcanizate, comprising;
   a) melt blending from about 20 to about 30 parts by weight of an engineering thermoplastic selected from the group consisting of polyester, polycarbonate, or polyphenylene oxide, or combinations thereof each having a melting point or glass transition temperature from about 160° C. to about 260° C. or more with from about 70 to about 80 parts by weight of an acrylate rubber or ethylene-acrylate rubber, or combinations thereof, having pendant or terminal carboxylic anhydride functionality, wherein said parts by weight are based upon 100 parts by weight total of said thermoplastic and said rubber;
   b) crosslinking said rubber with a multifunctional oxazoline, multifunctional oxazine, multifunctional imidazoline, or combinations thereof which does not degrade said engineering thermoplastic.

12. A process according to claim 11, wherein said polyester, polycarbonate, polyphenylene oxide or combinations thereof comprises at least one aromatic polyester.

13. A process according to claim 11, wherein said acrylate rubber, ethylene-acrylate rubber or combinations thereof is crosslinked to an extent wherein at least 90 weight percent of said rubbers are not extractable with a solvent that readily dissolves said rubber in uncrosslinked form.

14. A process according to claim 11, wherein said rubber prior to crosslinking has a total of from about 0.5 to about 10 mole percent of repeat units including a pendant anhydride of polycarboxylic acid.

15. A process according to claim 11, wherein said rubber is an acrylate rubber having from about 90 to about 98 mole percent repeat units from one or more acrylate monomers having from 4 to 15 carbon atoms.

16. A process according to claim 11, wherein said rubber is an ethylene-acrylate rubber having from about 48 to about 80 mole percent repeat units derived from ethylene, from about 1 to about 8 mole percent repeat units with carboxylic anhydride groups, and from about 19 to about 50 mole percent repeat units from alkyl acrylates having from 4 to 15 carbon atoms.

* * * * *